US006167486A

United States Patent [19]
Lee et al.

[11] Patent Number: 6,167,486
[45] Date of Patent: Dec. 26, 2000

[54] PARALLEL ACCESS VIRTUAL CHANNEL MEMORY SYSTEM WITH CACHEABLE CHANNELS

[75] Inventors: Jeffery H. Lee, Sunnyvale; Manabu Ando, Los Gatos, both of Calif.

[73] Assignee: NEC Electronics, Inc., Santa Clara, Calif.

[21] Appl. No.: 08/746,829

[22] Filed: Nov. 18, 1996

[51] Int. Cl.[7] .................................................. G06F 13/16
[52] U.S. Cl. ............................ 711/120; 711/123; 711/150
[58] Field of Search ................................ 711/119, 5, 120, 711/123, 125, 126, 128, 137, 138, 145, 203, 204, 106, 148, 149, 150; 365/203, 222; 340/825.06; 395/855

[56] References Cited

U.S. PATENT DOCUMENTS

| | | |
|---|---|---|
| 3,740,723 | 6/1973 | Beausoleil et al. . |
| 3,898,632 | 8/1975 | Spencer, Jr. . |
| 4,298,929 | 11/1981 | Capozzi .................................. 711/201 |
| 4,330,852 | 5/1982 | Redwine et al. . |
| 4,354,225 | 10/1982 | Frieder et al. .............................. 711/5 |
| 4,453,216 | 6/1984 | Chiba et al. .............................. 710/52 |
| 4,541,075 | 9/1985 | Dill et al. . |
| 4,577,293 | 3/1986 | Matick et al. . |
| 4,608,666 | 8/1986 | Uchida . |
| 4,608,668 | 8/1986 | Ohno et al. . |
| 4,644,502 | 2/1987 | Kawashima . |

(List continued on next page.)

FOREIGN PATENT DOCUMENTS

| | | |
|---|---|---|
| 0 301 921 A2 | 2/1989 | European Pat. Off. . |
| 0379436A1 | 1/1990 | European Pat. Off. . |
| 0492776B1 | 9/1991 | European Pat. Off. . |
| 0509811B1 | 4/1992 | European Pat. Off. . |
| 0535701A1 | 10/1992 | European Pat. Off. . |
| 0 550 164 A1 | 7/1993 | European Pat. Off. . |
| 0602807A2 | 11/1993 | European Pat. Off. . |
| 0639835A2 | 8/1994 | European Pat. Off. . |
| 5720983 | 7/1980 | Japan . |
| 60-258792 | 4/1984 | Japan . |
| 3-50297 | 2/1985 | Japan . |
| 62-38590 | 2/1987 | Japan . |
| 1-159891 | 12/1987 | Japan . |
| 63-81692 | 4/1988 | Japan . |
| 1-146187 | 6/1989 | Japan . |
| 3-142777 | 10/1989 | Japan . |
| WO91/16680 | 10/1991 | WIPO . |
| WO93/18459 | 9/1993 | WIPO . |

OTHER PUBLICATIONS

Ramtron International Corporation, "DM2202 EDRAM 1Mb×4 Enhanced Dynamic RAM", May 19, 1992.
MoSys, Inc., "MD904 to MD920, ½ to 2 ½ MBYTE Multibank DRAM (MDRAM) 128K×32 to 656K×32", Dec. 18, 1995.

(List continued on next page.)

*Primary Examiner*—B. James Peikari
*Attorney, Agent, or Firm*—Skjerven, Morril, MacPherson, Franklin & Friel LLP; Alan H. MacPherson; Gary J. Edwards

[57] ABSTRACT

A memory system having a main memory which is coupled to a plurality of parallel virtual access channels. Each of the virtual access channels provides a set of memory access resources for controlling the main memory. These memory access resources include cache resources (including cache chaining), burst mode operation control and precharge operation control. A plurality of the virtual access channels are cacheable virtual access channels, each of which includes a channel row cache memory for storing one or more cache entries and a channel row address register for storing corresponding cache address entries. One or more non-cacheable virtual access channels are provided by a bus bypass circuit. Each virtual access channel is addressable, such that particular memory masters can be assigned to access particular virtual access channels.

14 Claims, 6 Drawing Sheets

U.S. PATENT DOCUMENTS

| | | | |
|---|---|---|---|
| 4,646,270 | 2/1987 | Voss . | |
| 4,663,735 | 5/1987 | Novak et al. . | |
| 4,719,601 | 1/1988 | Gray et al. . | |
| 4,725,945 | 2/1988 | Kronstadt et al. | 711/106 |
| 4,731,758 | 3/1988 | Lam et al. | 365/189 |
| 4,758,987 | 7/1988 | Sakui | 365/189 |
| 4,758,995 | 7/1988 | Sato | 365/230 |
| 4,764,901 | 8/1988 | Sakuri | 365/189 |
| 4,769,789 | 9/1988 | Noguchi et al. | 365/189 |
| 4,794,559 | 12/1988 | Greenberger | 365/49 |
| 4,802,134 | 1/1989 | Tsujimoto | 365/230 |
| 4,819,213 | 4/1989 | Yamaguchi et al. | 365/233 |
| 4,829,471 | 5/1989 | Banerjee et al. . | |
| 4,837,746 | 6/1989 | Banerjee et al. | 365/189.05 |
| 4,849,937 | 7/1989 | Yoshimoto | 365/189.05 |
| 4,855,959 | 8/1989 | Kobayashi | 365/239 |
| 4,858,190 | 8/1989 | Yamaguchi et al. | 365/189.05 |
| 4,870,621 | 9/1989 | Nakada | 365/230.05 |
| 4,870,622 | 9/1989 | Aria et al. | 365/230.02 |
| 4,894,770 | 1/1990 | Ward et al. . | |
| 4,926,385 | 5/1990 | Fujishima | 365/230.05 |
| 4,928,246 | 5/1990 | Crawley et al. | 340/825.06 |
| 4,930,108 | 5/1990 | Sugiyama | 365/230.02 |
| 4,937,788 | 6/1990 | Harada | 365/189.04 |
| 4,943,944 | 7/1990 | Sakui et al. | 365/189.05 |
| 4,965,717 | 10/1990 | Cutts, Jr. et al. | 714/12 |
| 4,984,206 | 1/1991 | Komatsu et al. | 365/208 |
| 4,984,214 | 1/1991 | Hiltebitel et al. | 365/230.05 |
| 5,025,366 | 6/1991 | Baror | 711/128 |
| 5,025,421 | 6/1991 | Cho | 365/230.05 |
| 5,060,144 | 10/1991 | Sipple et al. | 710/200 |
| 5,111,386 | 5/1992 | Fujishima et al. . | |
| 5,134,616 | 7/1992 | Barth, Jr. et al. . | |
| 5,148,396 | 9/1992 | Nakada | 365/189.03 |
| 5,179,687 | 1/1993 | Hidaka et al. . | |
| 5,184,320 | 2/1993 | Dye | 365/49 |
| 5,184,325 | 2/1993 | Lipovski | 365/189.07 |
| 5,202,973 | 4/1993 | Ramanujan et al. | 711/147 |
| 5,214,610 | 5/1993 | Houston | 365/233.05 |
| 5,214,769 | 5/1993 | Uchida et al. | 711/151 |
| 5,226,009 | 7/1993 | Arimoto | 365/189.04 |
| 5,226,139 | 7/1993 | Fujishma et al. . | |
| 5,226,147 | 7/1993 | Fujishma et al. . | |
| 5,249,282 | 9/1993 | Segers . | |
| 5,289,413 | 2/1994 | Tsuchida et al. | 365/189.02 |
| 5,291,444 | 3/1994 | Scott et al. | 365/189.05 |
| 5,305,280 | 4/1994 | Hayano | 365/230.03 |
| 5,329,489 | 7/1994 | Diefendorff | 365/189.05 |
| 5,349,583 | 9/1994 | Christensen et al. | 370/434 |
| 5,353,427 | 10/1994 | Fujishima et al. . | |
| 5,359,722 | 10/1994 | Chan et al. . | |
| 5,367,486 | 11/1994 | Mori et al. | 365/189.05 |
| 5,381,370 | 1/1995 | Lacey et al. | 365/200 |
| 5,388,243 | 2/1995 | Glider et al. | 710/38 |
| 5,390,308 | 2/1995 | Ware et al. . | |
| 5,404,487 | 4/1995 | Murata et al. | 711/113 |
| 5,421,000 | 5/1995 | Fortino et al. . | |
| 5,459,856 | 10/1995 | Inoue | 711/113 |
| 5,469,558 | 11/1995 | Lieberman et al. | 710/105 |
| 5,471,601 | 11/1995 | Gonzales . | |
| 5,481,496 | 1/1996 | Kobayashi et al. | 365/189.05 |
| 5,509,132 | 4/1996 | Matsuda . | |
| 5,544,121 | 8/1996 | Dosaka et al. | 365/222 |
| 5,566,371 | 10/1996 | Ogawa | 365/230.03 |
| 5,584,041 | 12/1996 | Odawara et al. | 710/14 |
| 5,588,130 | 12/1996 | Fujishima et al. . | |
| 5,594,885 | 1/1997 | Lautzenheiser | 711/133 |
| 5,603,009 | 2/1997 | Komishi et al. . | |
| 5,619,673 | 4/1997 | Wang . | |
| 5,649,162 | 7/1997 | Klein et al. | 710/129 |
| 5,652,723 | 7/1997 | Dosaka et al. | 365/189.01 |
| 5,652,724 | 7/1997 | Manning | 365/189.05 |
| 5,878,240 | 3/1999 | Tomko | 711/148 |
| 5,895,481 | 4/1999 | Yap | 711/5 |

OTHER PUBLICATIONS

MoSys, Inc., "MC801xxK32 Multibank DRAM–Based Cache (MCACHE) 32K, 64K, 128K×32 PBSRAM Replacement", Jul. 9, 1996.

Mitsubishi, "M5M44409TP–10–20, Target Spec. (REV 1.0)", Mitsubishi Data Sheet, pp. 1–52, (Dated Apr. 15, 1991).

Barry Norman, "Static Column Ram Almost Doubles Data Rates", Electronic Design, pp. 259–263, (Dated Feb. 23, 1984).

Masahiko Yoshimoto et al., , "A Divided Word–Line Structure in the Static RAM And Its Application to a 64K Full CMOS RAM", IEEE Journal of Solid–State.

James R. Goodman & Men Chow Change, "The Use of Static Column Ram as a Memory Hierarchy", The 11th Annual Symposium on Computer Architecture.

Takayasu Sakurai et al,, "A 1Mb Virtually SRAM, 1986 IEEE International Solid–State Circuits Conference", Digest of Technical Papers, pp. 252–253 & 364.

Ohta et a., "A 1Mb DRAM With, 33 Mhz Serial I/O Ports", Digest of Technical Papers, 1986 IEEE International Solid State Circuits Conference, pp. 274–275.

Mikio Asakur et al., "An Experiment 1 Mbit Cache Dram With ECC"., 43–44, (Dated May 25, 1989)IEEE Journal of Solid State Circuits, vol. 25, No. 1, Feb. 1999.

K Arimoto et al., "A Circuit Design of Intelligent CDRAM with Automatic Write–Back Capability", Symposium of VLSI Circuit, Digest of Technical pp. 79–.

Hidaka et al., "The Cache DRAM Architecture: A DRAM with an On–Chip Cache Memory", IEEE Micro, pp. 14–24, (Dated Apr. 1990).

Hideto Niijima & Nobuyuki Oba, "QRAM–Quick Access Memory System", Proceedings, 1990 IEEE International Conference on Computer Design: VLSI IN.

Dosaka, et al., "A 100 mhz 4Mb Cache DRAM With Fast Copy–Back Scheme", Digest of Technical Papers, 1992 IEEE International Solid–State Circuits.

Hitachi, "Video RAM, Specification for Parts HM53461 and HV53462", pp. 30–33, (No Date Available).

PARALLEL ACCESS VIRTUAL CHANNEL MEMORY SYSTEM WITH CACHEABLE CHANNELS

BACKGROUND OF THE INVENTION

1. Field of the Invention

The present invention relates to a memory system for a semiconductor memory. More particularly, the present invention relates to a memory system which provides a plurality of virtual access channels to facilitate access by a plurality of memory masters.

2. Description of the Prior Art

Conventional data processing systems typically include multiple processors/processes which share a system memory. The multiple processors/processes (i.e., memory masters) access the system memory (e.g., general system memory or graphic frame buffer memory) in a multi-tasking manner. The memory masters can include central processing units (CPUs), graphics processors, PCI bus masters and EISA/ISA bus masters. Each memory master accesses portions of the system memory which exhibit an address locality, a time locality and/or a particular block size. It would therefore be desirable to have a memory system which allows multiple memory masters to access a system memory in an efficient manner. It would further be desirable if such a memory system could be dynamically modified to accommodate different types of memory masters.

FIG. 1 is a block diagram of a multi-processing system 100 which employs a shared memory architecture. System 100 includes processors 101a–101c, dedicated cache memories 102a–102c, dedicated cache controllers 103a–103c, system bus 104, global main memory 105 and memory controller 106. Processors 101a–101c share main memory 105 through common parallel system bus 104. Cache memories 102a–102c are typically constructed using relatively high speed SRAM arrays. Main memory 105 is typically constructed using relatively low speed and low cost DRAM arrays. Systems such as system 100 are described in the following references: (1) "Protocols Keep Data Consistent", John Gallant, EDN Mar. 14, 1991, pp.41–50 and (2) "High-Speed Memory Systems", A. V. Pohm and O. P. Agrawal, Reston Publishing, 1983, pp.79–83.

Dedicated cache memories 102a–102c reduce the frequency with which each of processors 101a–101c access main memory 105. This reduces the amount of traffic on system bus 104. However, cache memories 102a–102c are relatively expensive. In system 100, an expensive cache memory must be added for each added processor. In addition, system 100 requires control logic to maintain the consistency of data in cache memories 102a–102c and main memory 105 (i.e., cache coherence). The problem of cache coherence is described in more detail in "Scalable Shared Memory Multiprocessors", M. Dubois and S. S. Thakkar, Kluwer Academic Publishers, 1992, pp.153–166. The control logic required to provide cache coherence increases the cost and decreases the performance of system 100. In addition, the efficiency of main memory 105 and system bus 104 suffers if the data values fetched into cache memories 102a–102c are not used.

FIG. 2 is a block diagram of another conventional multi-processor system 200 which includes a global main memory 204 which is divided into modules 206a–206c. Each of main memory modules 206a–206c is attached to a single corresponding cache memory module 205a–205c, respectively. Each of cache memory modules 205a–205c is attached to a main memory bus 202. Processors 201a–201c are also attached to main bus 202. Processors 201a–201c share cache memory modules 205a–205c and main memory modules 206a–206c. System 200 is described in, "High-Speed Memory Systems", Pohm et al., pp.75–79. When the number of processors is approximately equal to the number of memory modules (i.e., cache memory modules), cache thrashing can occur. Cache thrashing refers to the constant replacement of cache lines. Cache thrashing substantially degrades system performance.

To minimize the cost of SRAM cache memories, some prior art systems use additional prefetch buffers for instructions and data. These prefetch buffers increase the cache-hit rate without requiring large cache memories. Such prefetch buffers are described in PCT Patent Application PCT/US93/01814 (WO 93/18459), entitled "Prefetching Into a Cache to Minimize Main Memory Access Time and Cache Size in a Computer System" by Karnamadakala Krishnamohan et al. The prefetch buffers are used in a traditional separate cache memory configuration, and memory bandwidth is consumed by both the prefetch operations and the caching operations. A robust prefetch algorithm (with a consistently high probability of prefetching the correct information) and an adequate cache size and organization (to provide a high cache hit rate) is required to deliver any performance improvement over traditional caching schemes.

Other conventional systems use the sense-amplifiers of a DRAM array as a cache memory. (See, e.g., PCT Patent Publication PCT/US91/02590, by M. Farmwald et al.) Using the sense-amplifiers of a DRAM array as cache memory provides low cost, high transfer bandwidth between the main memory and the cache memory. The cache hit access time, equal to the time required to perform a CAS (column access) operation, is relatively short. However, the cache miss access time of such a system is substantially longer than the normal memory access time of the DRAM array (without using the sense amplifiers as a cache memory). This is because when the sense amplifiers are used as cache memory, the DRAM array is kept in the page mode (or activated mode) even when the DRAM array is not being accessed. A cache miss therefore requires that the DRAM array perform a precharge operation followed by RAS (row access) and CAS (column access) operations. The time required to perform the precharge operation (i.e., the precharge time) is approximately twice as long as the time required to perform the RAS operation. The total memory access time is therefore equal to the sum of the precharge time, the RAS access time and the CAS access time of the DRAM array. In contrast, during normal operation of the DRAM array, the DRAM array is in precharged mode when it is not being accessed, and the memory access time is equal to the RAS access time plus the CAS access time of the DRAM array.

Another prior art cache memory system includes an SRAM cache memory which is integrated into a DRAM array. The DRAM array includes four banks which collectively serve as the main system memory. The SRAM cache memory includes a cache row register which has the capacity to store a complete row of data from one of the banks of the DRAM array. A last row read (LRR) address latch stores the address of the last row read from the DRAM array. When the row address of a current read access is equal to the row address stored in the LRR address latch, the requested data values are read from the row register, rather than the DRAM array. Thus, there is one cache entry in the cache row register which is shared by each of the four banks in the DRAM array. This prior art memory system is described in more detail in DM 2202 EDRAM 1 MB×4 Enhanced Dynamic RAM, Preliminary Datasheet, Ramtron International Corp., pp. 1–18.

It is therefore desirable to have a memory system which overcomes the previously described shortcomings of the prior art memory systems.

SUMMARY

In accordance with the present invention, a memory system includes a main memory and a plurality of virtual access channels connected in parallel to the main memory. The main memory typically includes a plurality of memory banks. Each of the virtual access channels includes a set of memory access resources for accessing the main memory. These memory access resources can include, for example, cache resources, burst access control resources, and memory precharge resources. Each of the virtual access channels is independently addressable by an external memory master.

By enabling the virtual access channels to be addressed by external memory masters, the virtual access channels can be flexibly assigned to serve different memory masters as required by the data processing system to which the memory system is connected. For example, one memory master can be assigned to access two virtual access channels, while several other memory masters can be assigned to share the access of a single virtual access channel. These assignments can be static or can be changed dynamically during normal operation of the memory system. These assignments can also be modified for connection to different data processing systems.

In one embodiment, the virtual access channels include a plurality of cacheable virtual access channels which perform caching operations. In such an embodiment, each of the cacheable virtual access channel includes a cache data memory for storing one or more cache data entries, and a corresponding cache address memory for storing one or more corresponding cache address entries. By assigning a cacheable virtual access channel to service each of the memory masters, each of the memory masters is advantageously provided with a dedicated cache memory resource. The virtual access channels can also include a non-cacheable virtual access channel which enables the cacheable virtual access channels to be bypassed when a cache miss occurs.

The present invention also includes a method of accessing a memory array which includes the steps of: (1) coupling a virtual access system to the memory array, wherein the virtual access system has a plurality of virtual access channels connected in parallel to the memory array, each virtual access channel providing a set of memory access resources for accessing the memory array, (2) assigning each of the memory masters to access one or more of the virtual access channels, (3) providing an access address from the memory masters to the virtual access system, and (4) accessing a selected one of the virtual access channels in response to the access address.

This method can also include the steps of (5) storing a cache entry and a corresponding cache address entry in the selected virtual access channel, (6) comparing the access address with the cache address entry, and (7) accessing the cache entry if the access address matches the cache address entry. If the access address does not match the cache address entry, then the memory array can be accessed through a bus bypass circuit. In this case, the cache entry of the selected virtual access channel is updated to reflect the data value accessed through the bus bypass circuit, and the cache address entry is updated to reflect the address accessed.

In a variation of this method, two of the virtual access channels can be activated at the same time, with one of the virtual access channels performing operations at the interface between the virtual access channels and the memory masters, while another one of the virtual access channels is performing operations at the interface between the virtual access channels and the memory array. This advantageously provides for improved concurrency of operations within the memory system.

In another variation of this method, the operating modes of each of the virtual access channels are independently programmed. For example, each virtual access channel can be individually programmed to have specific cache chaining modes, burst lengths and precharge modes. This enables the virtual access channels to be individually tailored to best serve the operating needs of the corresponding memory master.

The present invention will be more fully understood in light of the following detailed description taken together with the drawings.

DETAILED DESCRIPTION

Figure 1:
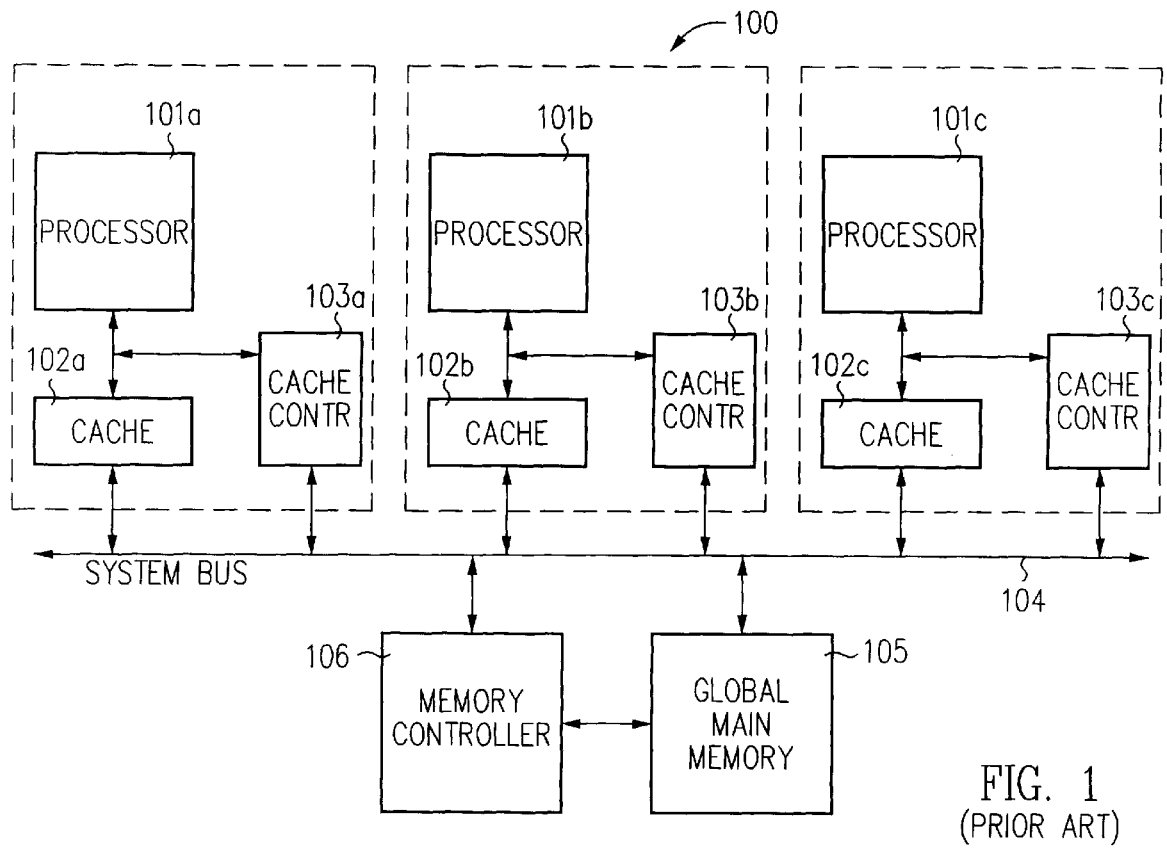
FIG. 1 is a block diagram of a conventional multi-processor system which employs a shared memory architecture.
Figure 2:
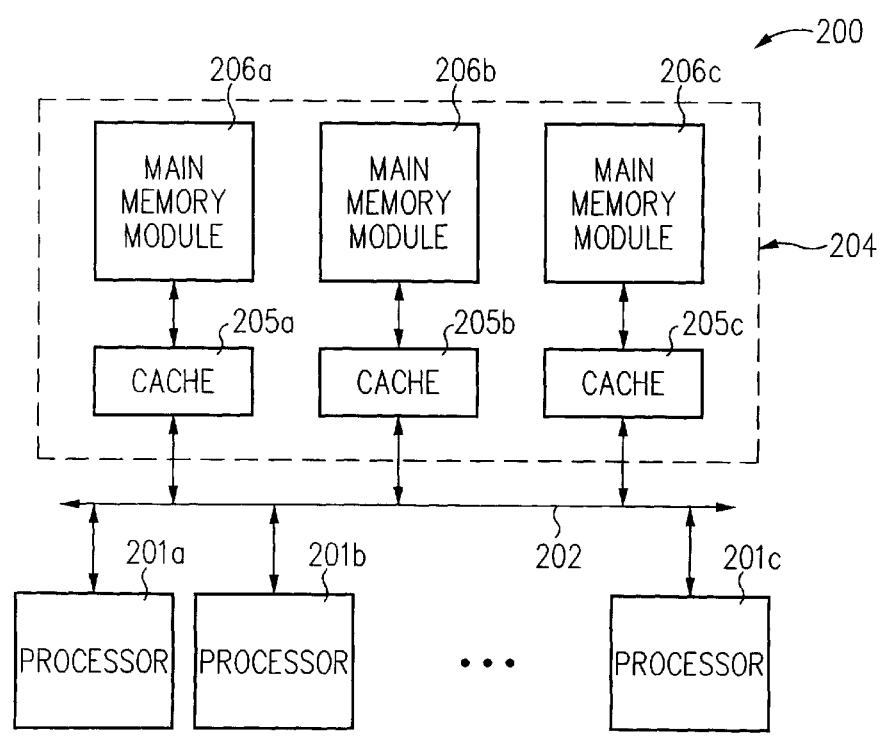
FIG. 2 is a block diagram of another conventional multi-processor system which includes a global main memory divided into modules.
Figure 3A:
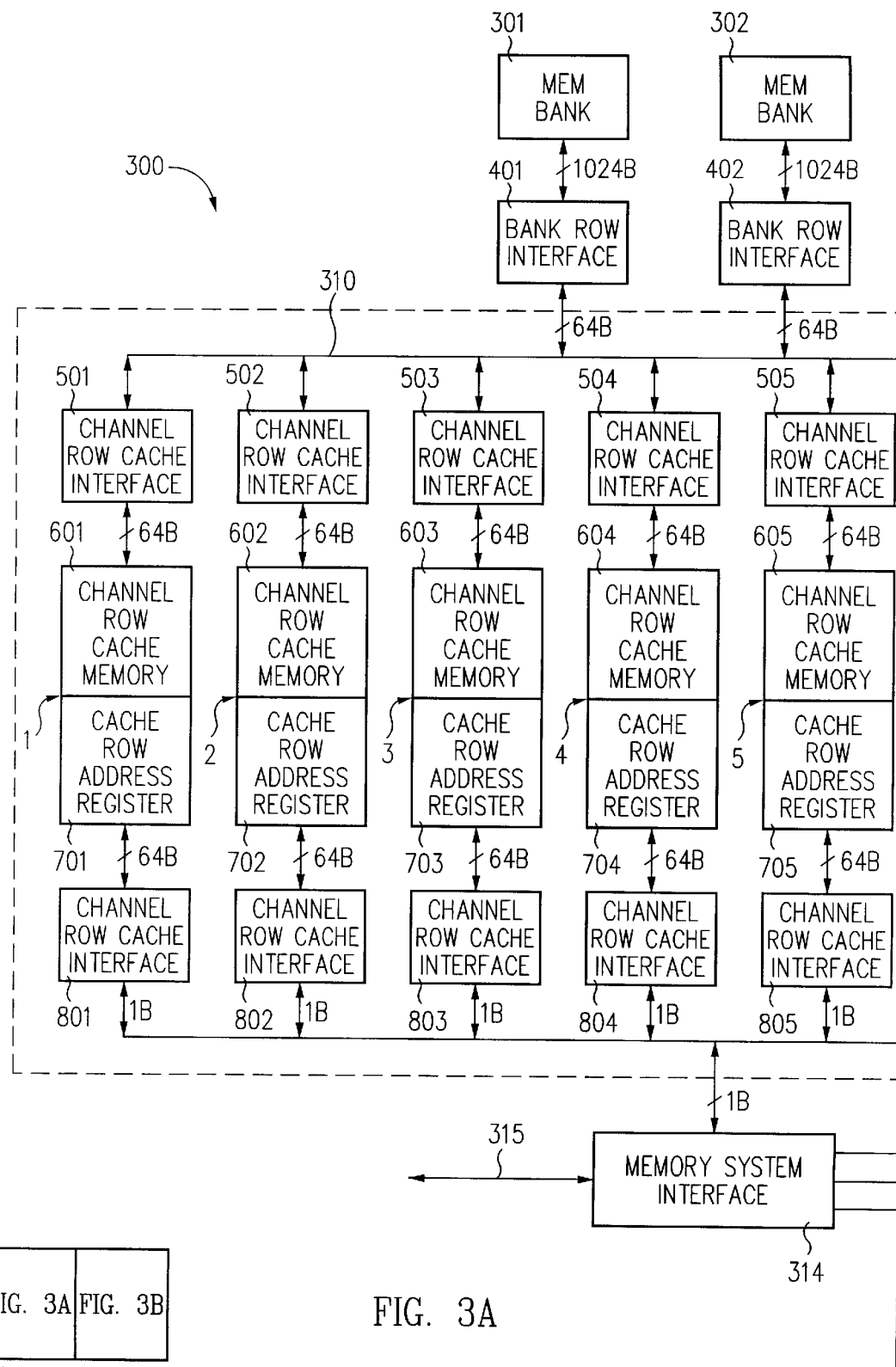
FIG. 3 (consisting of FIG. 3A and FIG. 3B) is a block diagram of a memory system in accordance with one embodiment of the present invention.
Figure 3B:
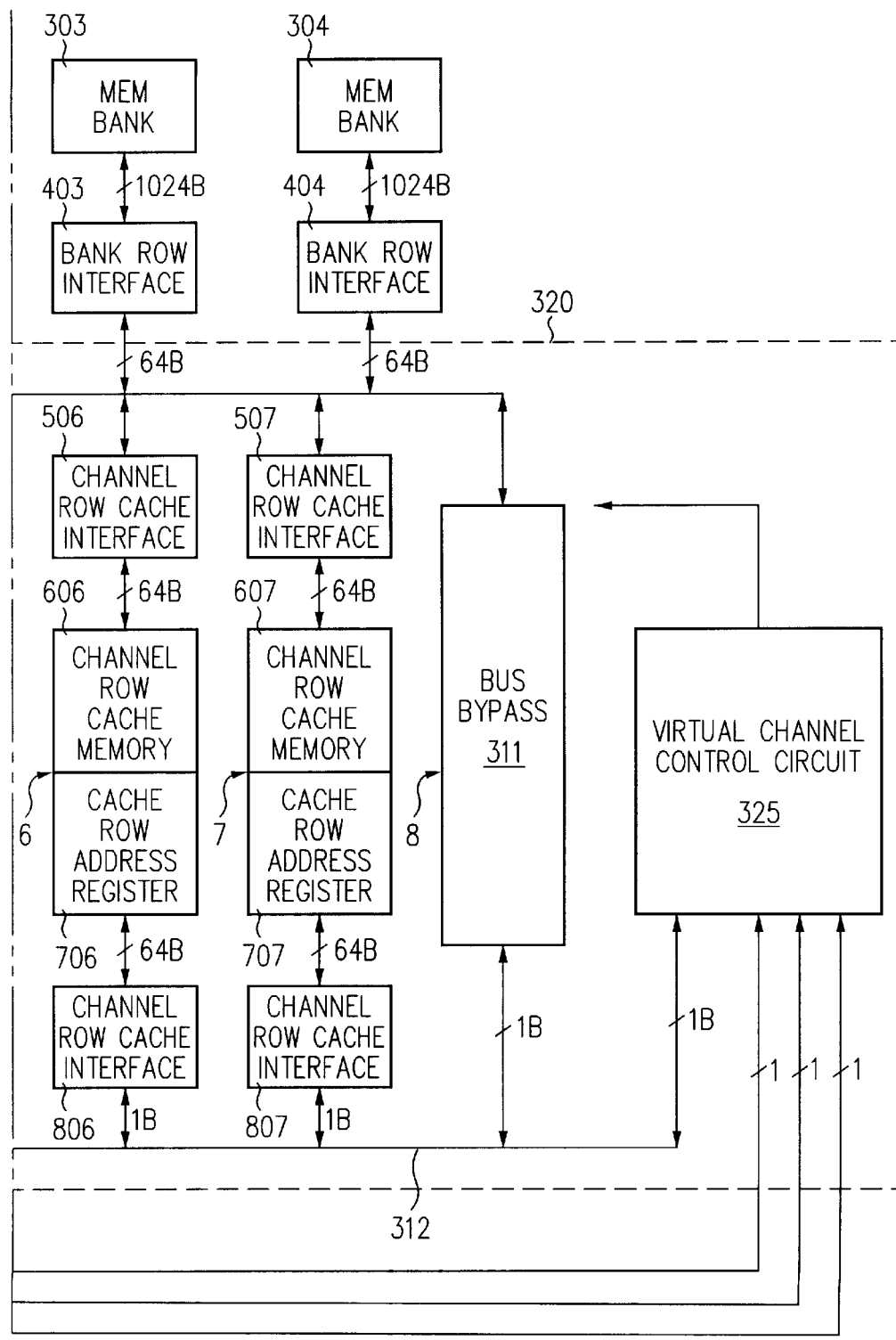

FIG. 3 is a block diagram of a memory system 300 in accordance with one embodiment of the present invention. Memory system 300 includes memory banks 301–304, bank row interface circuits 401–404, memory bank interface bus 310, virtual channel system 320, memory system interface bus 312, memory system interface 314 and system bus 315. Memory system interface 314 is coupled to one or more external memory masters (not shown) through the system bus 315.

The virtual channel system 320 includes memory bank interface bus 310, channel row cache interface circuits 501–507, channel row cache memories 601–607, cache row address registers 701–707, channel row cache interface circuits 801–807, bus bypass circuit 311, memory system interface bus 312, and virtual channel control circuit 325.

In general, virtual channel system 320 provides a plurality of independent memory access resources, which are hereinafter referred to as "virtual access channels". Each virtual access channel is located between memory banks 301–304 and memory system interface 314. Virtual channel system 320 includes eight virtual access channels 1–8. Seven cacheable virtual access channels 1–7 are defined by the seven channel row cache circuits 601–607, their seven corresponding cache row address registers 701–707, and their corresponding channel row cache interface circuits 501–507 and 801–807. One non-cacheable virtual access channel 8 is defined by the bus bypass circuit 311. As described in more detail below, each cacheable virtual access channel is capable of acting as an independent cache memory. The non-cacheable virtual channel 8 provides for direct accessing of the memory banks 301–304.

Each of the virtual access channels 1–8 is individually selectable externally via the pins of the chip on which memory system 300 is located. The virtual access channels 1–8 are individually addressable through virtual channel control circuit 325. Thus, a memory master coupled to system bus 315 can provide a 3-bit address signal to virtual channel control circuit 325 (through memory system interface 314). In response to this 3-bit address signal, the virtual channel control circuit 325 enables or selects one of the eight virtual access channels 1–8. In this manner, a different memory master (e.g., CPU, memory controller or graphic controller) can be mapped to each virtual access channel. Table 1 below lists a virtual access channel addressing scheme in accordance with one embodiment of the invention.

TABLE 1

| 3-bit Virtual Channel Address | Addressed Virtual Channel (Defined Element Reference Nos.) |
| --- | --- |
| 000 | 1 (inc. 501, 601, 701, 801) |
| 001 | 2 (inc. 502, 602, 702, 802) |
| 010 | 3 (inc. 503, 603, 703, 803) |
| 011 | 4 (inc. 504, 604, 704, 804) |
| 100 | 5 (inc. 505, 605, 705, 805) |
| 101 | 6 (inc. 506, 606, 706, 806) |
| 110 | 7 (inc. 507, 607, 707, 807) |
| 111 | 8 (inc. 311) |

The virtual access channels provide each memory master accessing the memory system 300 with its own channel for high speed unimpeded access to the memory banks 301–304. As a result, multiple memory masters can operate concurrently, each with its own virtual access channel. Each memory master operates at its own speed, according to its own processing needs, to access memory banks 301–304 as needed. The single bus 310 between memory banks 301–304 and virtual access channels 1–8 indicates that there can only be one operation (read/write) between the memory banks 301–304 and the virtual access channels 1–8 at any given time. The separate bus 312 between virtual access channels 1–8 and memory system interface 314 indicates that there can only be one operation between the virtual access channels 1–8 and the memory system interface 314 at any given time. However, operations between the memory banks 301–304 and virtual access channels 1–8 and operations between the virtual access channels 1–8 and memory interface system 314 can take place concurrently.

Memory system 300 provides very fast read and write access to the external memory masters once the virtual access channels 1–7 have been loaded. The virtual access channels are loaded using the same operating and timing sequence as a standard synchronous DRAM (SDRAM) operation. In the described embodiment, a two phase command/data format is implemented in which commands are decoded in a first phase of a clock signal and executed in a second phase of the clock signal. The cacheable virtual access channels 1–7 operate at a peak hit rate, with little or no cache thrashing, because all of the cacheable virtual access channels 1–7 are directly managed from an external host memory controller which is able to map different channels to different memory masters to avoid mutual interference. By allowing the host memory controller to directly manage the channels, the cacheable virtual access channels 1–7 are effective in automatically tracking various dynamically changing spatial and temporal localities, and provide fast cache accesses for all processes in a multitasking system environment.

Memory system 300 exhibits the access speed of an SDRAM when the cacheable virtual access channels 1–7 are not performing a caching function, and exhibits the access speed of a PC second level (L-2) cache memory when the cacheable virtual access channels 1–7 are performing a caching function. The speed of memory system 300 is thereby improved to the full access speed of the cacheable virtual access channels 1–7. This performance is, of course, limited by the performance bandwidth of the memory system interface 314 and system bus 315. In particular embodiments, a single memory master can access more than one virtual access channel, thereby minimizing the probability of cache thrashing.

The present invention will now be described in detail. In the described embodiment, memory banks 301–304 are conventional dynamic random access memory (DRAM) arrays. DRAM arrays are used because of the relatively small layout area required for each memory cell. However, the present invention is not limited by the type of memory used to implement memory banks 301–304. In other embodiments, memory banks 301–304 can be implemented using static random access memory (SRAM) arrays.

In the described embodiment, each of memory banks 301–304 includes 512 rows and 8192 columns of memory cells. The 8192 columns define 1024 8-bit bytes. Thus, the capacity of each of memory banks 301–304 is 512 kBytes, and the total capacity of memory banks 301–304 is 2 MBytes. The invention is not limited to the memory capacity or row/column configuration described in the present embodiment. The organization of the memory banks in terms of numbers of rows and columns is determined by the desirability of parallelisms within the memory banks and the limits of die size efficiency.

Moreover, although four memory banks 301–304 are illustrated in FIG. 3, any number of memory banks can be used in other embodiments of the invention. For example, in different embodiments, memory banks 301–304 can be replaced by a single memory bank, two memory banks, eight memory banks or sixteen memory banks. The number of banks in memory system 300 is determined by the need to provide concurrence of operations. As a predefined total memory capacity is divided into a greater number of memory banks, the granularity of memory system 300 increases. In addition, as more memory banks are used, a greater number of memory banks can be activated (i.e., connected to their corresponding sense amplifier circuits in preparation for the arrival of a column address to perform read or write operations) to perform various operations while other banks are occupied with un-interruptable operations such as activation, precharge, read, write or refresh operations. At the same time, the number of memory banks used to provide a given memory capacity is constrained by the practicality of die size and the cost of the memory chip which contains memory system 300.

Each of memory banks 301–304 includes a sense amplifier circuit. Each sense amplifier circuit is coupled to the bit (column) lines within the corresponding memory bank, such that each sense amplifier circuit stores an entire row of data (1024 bytes) during a read or write operation. Such sense amplifier circuits are well known in the art. The sense amplifier circuits of memory banks 301–304 are coupled to bank row interface circuits 401–404, respectively. Bank row interface circuits 401–404, which are controlled by address signals received from virtual channel control circuit 325, provide data pathways between the sense amplifier circuits of memory arrays 301–304 and the memory bank interface bus 310. Bank row interface circuits 401–404 are controlled to ensure that only one of the memory banks 301–304 drives the memory bank interface bus 310 at any given time. Bank row interface circuits 401–404 are also controlled such that one or more of the memory banks 301–304 can simultaneously receive data from the memory bank interface bus 310.

In different embodiments, the memory bank interface bus 310 can be wider or narrower than the sense amplifier circuits of memory banks 301–304. In the described embodiment, the width of each sense amplifier circuit is an integer multiple of the width of memory bank interface bus 310. More specifically, each sense amplifier circuit is 1024 bytes wide (i.e., the physical row width of memory banks 301–304), and the memory bank interface bus 310 is only 64 bytes (512 bits) wide. In this case, during a read operation, the selected memory bank provides a 1024 byte row of data to its associated sense amplifier circuit. The bank row interface circuit corresponding to the selected memory bank then passes one of the sixteen 64-byte words present in the 1024 byte row to the memory bank interface bus 310. In this manner, the selected bank row interface circuit performs a multiplexing function.

Conversely, during a write operation, a 64-byte word to be written to a selected memory bank is provided to memory bank interface bus 310. The appropriate bank row interface circuit performs a de-multiplexing function to pass this 64-byte word to a selected one of the sixteen 64-byte word locations within the corresponding sense amplifier circuit. In this manner, the bank row interface circuits 401–404 perform bi-directional multiplexing/de-multiplexing functions.

Alternatively, the memory bank interface bus 310 can have a width which is an integer multiple of the width of the sense amplifier circuits. In this case, each of bank row interface circuits 401–404 performs a de-multiplexing function to route data read from the selected memory banks (i.e., multiple banks can be read at the same time) to a selected subset of the bus lines of the memory bank interface bus 310. Similarly, each of bank row interface circuits 401–404 performs a multiplexing function to route data to be written to memory banks 301–304 from a subset of the bus lines of the memory bank interface bus 310 to the selected sense amplifier circuit.

Memory bank interface bus 310 extends in parallel from bank row interface circuits 401–404 to channel row cache interface circuits 501–507 and bus bypass circuit 311. Channel row cache interface circuits 501–507 provide an interface between the memory bank interface bus 310 and the corresponding channel row cache circuits 601–607. The width of the channel row cache circuits 601–607 may be wider or narrower than the width of the memory bank interface bus 310. As such, channel row cache interface circuits 501–507 may perform multiplexing and de-multiplexing functions between the memory bank interface bus 310 and the channel row cache circuits 601–607 as necessary. In the described embodiment, the channel row cache circuits 601–607 and the memory bank interface bus 310 each have a width of 64 bytes. Thus, no multiplexing function is necessary in this embodiment. As described in more detail below, the operations of channel row cache interface circuits 501–507 are controlled by virtual channel control circuit 325.

Implicit in the design of the memory bank interface bus 310 is a timing control that gates the signals from memory banks 301–304 or channel row cache circuits 601–607 to the memory bank interface bus 310, depending upon whether a read or a write operation is being performed by the memory banks 301–304. More specifically, implicit timing controls ensure that the channel row cache interface circuits 501–507 only drive the memory bank interface bus 310 during write operations to the memory banks 301–304. Similarly, the timing controls ensure that bank row interface circuits 401–404 only drive the memory bank interface bus 310 during read operations from memory banks 301–304.

As previously described, each channel row cache interface circuit 501–507 is coupled to a corresponding one of channel row cache memories 601–607. The number of channel row cache memories 601–607 defines the number of cacheable virtual access channels in memory system 300. Although seven cacheable virtual access channels 1–7 are present in the described embodiment, any integer number of cacheable virtual access channels are possible. For example, in another embodiment, 15 cacheable virtual access channels are used. The number of cacheable virtual access channels may be greater than, equal to, or less than the number of memory banks. Each of channel row cache memories 601–607 has an integer number, N, of independently loadable and addressable cache entries, where N is an integer equal to or greater than one. That is, each of channel row cache memories 601–607 has at least one cache entry. Each cache entry has the capacity (width) to store a number of data bytes corresponding to a full or partial row of one of the memory banks 301–304. Each of channel row cache memories 601–607 can be parallel loaded from any one of the memory banks 301–304.

Each of channel row cache memories 601–607 is associated with a corresponding one of cache row address registers 701–707. Each of cache row address registers 701–707 stores N cache addresses. That is, each cache entry in channel row cache memories 601–607 has a corresponding cache address stored in a corresponding one of cache row address registers 701–707.

Figure 4:
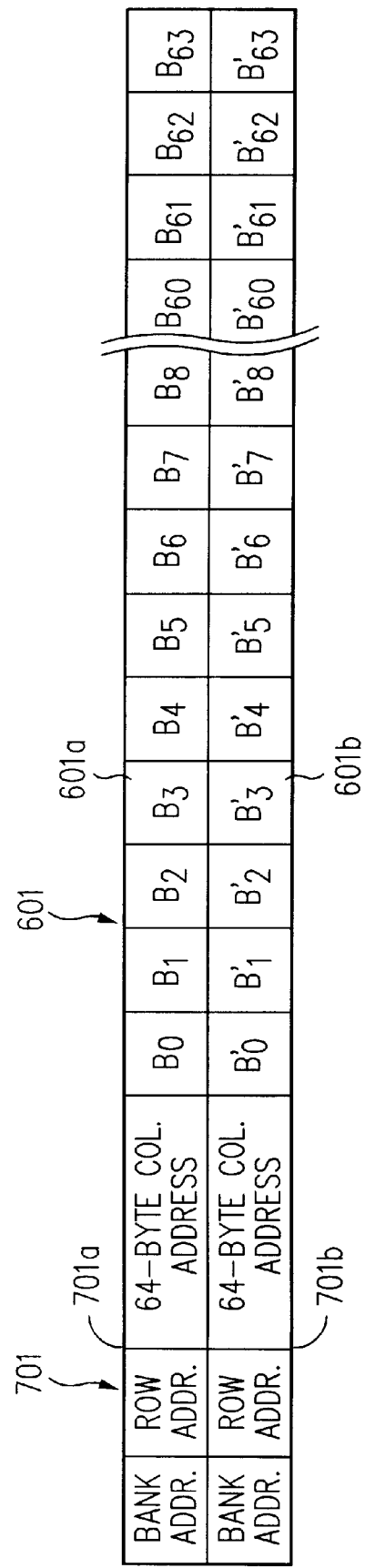
FIG. 4 is a schematic diagram of a channel row cache memory and cache row address register in accordance with one embodiment of the invention.

FIG. 4 is a schematic diagram of channel row cache memory 601 and cache row address register 701 in accordance with one embodiment of the invention. In this embodiment, N is equal to two, such that there are two cache entries 601a, 601b in channel row cache memory 601 and two corresponding cache addresses 701a, 701b in cache row address register 701. The first cache entry 601a in channel row cache memory 601 is a 64-byte word $B_0$–$B_{63}$. The first cache address 701a in channel row address register 701 stores an address which identifies: (1) the memory bank, (2) the row address, and (3) the column address corresponding to the 64-byte word $B_0$–$B_{63}$. For example, the first cache address 701a in cache row address register 701 could indicate that the first cache entry 601a in the channel row cache memory 601 was received from memory bank 302, row number 256, and column position 64. Similarly, the second cache entry 601b is a 64-byte word $B_0$–$B_{63}$ which is identified by the second cache address 701b.

Although cache row address registers 701–707 are shown as being part of memory system 300, in other embodiments, these cache row address registers can be implemented in the controllers of the memory masters which access memory system 300.

Channel row cache interface circuits 801–807 couple the channel row cache memories 601–607 and the cache row address registers 701–707 to the memory system interface bus 312. Note that FIG. 3 explicitly illustrates the data paths, but not the address paths, within memory system 300. Because the channel row cache memories 601–607 have a width of 64 bytes, and the memory system interface bus 312 has a width of 1 byte, the channel row cache interface circuits 801–807 perform multiplexing and de-multiplexing functions to enable data transfer between these elements. Channel row cache interface circuits 801–807 are controlled by virtual channel control circuit 325 as described in more detail below.

Bus bypass circuit 311 provides a non-cacheable virtual access channel between memory bank interface bus 310 and memory system interface bus 312. Because the memory bank interface bus 310 has a width of 64 bytes, and the memory system interface bus 312 has a width of 1 byte, the bus bypass circuit 311 performs multiplexing and de-multiplexing functions to enable data transfer between these buses. Bus bypass circuit 311 is controlled by virtual channel control circuit 325 as described in more detail below.

The memory system interface bus 312 is a parallel bus which couples the channel row cache interface circuits 801–807, the bus bypass circuit 311 and the virtual channel control circuit 325 to the memory system interface 314. The memory system interface bus 312 can be a multiplexed address/data bus. Alternatively, dedicated data and address paths can be provided by memory system interface bus 312. The memory system interface 314 includes the input/output pin drivers associated with memory system 300. If the memory system interface 314 is coupled to an address/data multiplexed bus, then the appropriate de-multiplexers are also provided in the memory system interface 314. Memory system interface 314 also provides circuitry required to perform any logic voltage conversions.

Virtual channel control circuit 325 includes the control logic for controlling bank row interface circuits 401–404, channel row interface circuits 501–507, cache row address registers 701–707, channel row interface circuits 801–807, and bus bypass circuit 311.

Operation of memory system 300 proceeds as follows. Initially, the external processing system which is coupled to system bus 315 determines which memory masters will access which virtual access channels. That is, the external processing system assigns each memory master to one or more of the virtual access channels. Each virtual access channel is accessed by one or more external memory masters. These assignments are determined by the memory controller logic, the system BIOS, or the memory management manager part of the operating system. The assignments may be static (i.e., never change once assigned), or dynamic (i.e., the memory manager juggles the virtual channel assignments as the system resources change). The virtual channels can be assigned as needed by the system processors.

To initiate a memory access, an external memory master provides the following information to memory system interface 314: (1) a current access address, which includes the bank, row and column addresses of the current access (2) a read/write signal which identifies the access as a read or a write operation, (3) a write data byte, if the current access is a write operation, and (4) a plurality of virtual channel select signals which identify the virtual access channel being accessed by the memory master.

The memory system interface 314 provides the virtual channel select signals to virtual channel control circuit 325, thereby informing virtual channel control circuit 325 of the virtual access channel being accessed by the memory master. The memory system interface 314 also provides the current access address to the virtual channel control circuit 325. In response, the virtual channel control circuit 325 compares the current access address with the cache addresses stored in the cache row address register of the selected virtual access channel. For example, if the virtual channel select signals identify the virtual access channel which includes channel cache row memory 601 and cache row address register 701, then virtual channel control circuit 325 compares the current access address with the cache addresses 701a, 701b in cache row address register 701 to determine whether a match (cache hit) exists.

Read Operations

If a match does not exist (cache miss), and the read/write signal indicates that the memory access is a read operation, then the virtual channel control circuit 325 causes a row of 1024 data bytes to be read from one of memory banks 301–304. The particular row and memory bank are selected in response to the current access address. The selected memory bank is accessed using a conventional SDRAM RAS-CAS command sequence. The addressed row of data bytes is provided to the bank row interface circuit corresponding to the addressed memory bank. The virtual channel control circuit 325 further causes this corresponding bank row interface circuit to selectively pass a 64-byte word of from the row of 1024 data bytes to memory bank interface bus 310. This 64-byte word is selected in response to the column address of the current access address. The 64-byte word is selected to include the data byte corresponding to the current access address and 63 other consecutive data bytes. The addressed data byte is routed through the bus bypass circuit 311 to the memory system interface 314 and provided to the memory master. Note that bus bypass circuit 311 only passes one selected byte of the received 64-byte word.

In addition, the 64-byte word is routed from memory bank interface bus 310 to channel row cache interface circuits 501–507. The virtual channel control circuit 325 enables only the channel row interface circuit which corresponds to the selected virtual access channel, thereby causing the 64-byte word to be written as a cache entry to the channel row cache memory of the selected virtual access channel. For example, the virtual channel control circuit 325 could enable cache row interface circuit 501 to cause the 64-byte word to be written to cache entry 601a of channel row cache memory 601. Virtual channel control circuit 325 further causes the bank address, the row address and a portion of the column address (i.e., that portion defining the column location of the 64-byte word) of the current access address to be written to the cache row address register of the selected virtual access channel. For example, the virtual channel control circuit 325 could cause the appropriate portion of the current access address to be written as cache address 701a in cache row address register 701.

If there is only one cache entry per virtual access channel, a cache miss results in the overwriting of the previous cache entry and the previous corresponding cached address in the selected virtual access channel. If the virtual access channel depth is greater than one, a cache miss results in the updating of one of the cache entries and its corresponding cache address within the selected virtual access channel. The methods used to select the cache entry to be updated can include, but are not limited to, one or more of the following methods: (1) overwriting the least recently used cache entry, (2) overwriting the entry on a round-robin basis, (3) randomly overwriting the cache entry, and (4) overwriting the cache entry with the row address closest to the new row address.

The virtual channel control circuit 325 detects if the current access address matches a cache address stored in the cache row address register of the virtual access channel identified by the virtual channel select signals (cache hit). Upon detecting a cache hit, the virtual channel control circuit 325 enables the cache row interface circuit (801–807) of the selected virtual access channel to pass the addressed data byte from the channel row cache memory of the selected virtual access channel. For example, the virtual channel control circuit 325 can cause cache row interface circuit 801 to pass data byte $B_3$ from cache entry 601a of channel row cache memory 601 when the current access address matches the cache address 701a stored in cache row address register 701. Accessing channel row cache memories 601–607 when cache hits occur eliminates the need to access the slower memory banks 301–304.

Virtual channel control circuit 325 can also facilitate burst read accesses. In such an embodiment, a memory master requesting a burst read access asserts a burst enable control signal to inform the virtual channel control circuit 325 that the read operation is to be a burst read access. In this embodiment, the virtual channel control circuit 325 includes a burst access control register (not shown). The burst access control register can be, for example, a 40-bit register which is partitioned into eight 5-bit entries. Each 5-bit entry identifies the burst access length for a corresponding one of the eight virtual access channels. For example, the virtual access channels can have burst access lengths of 2, 4, 8, 16, 32, or 64 bytes. Different virtual access channels can have different burst access lengths, depending upon the characteristics of the particular memory masters accessing the virtual access channels. The burst access control register is programmed by the external data processing system in view of the characteristics of the memory masters of the data processing system. The virtual channel control circuit 325 controls the burst access operations.

In a preferred embodiment, channel row cache aliasing is implemented. In channel row cache aliasing, the virtual channel control circuit 325 determines whether the current access address matches a cache address stored in any of the cache row address registers 701–707. That is, the current access address is compared with all of the cache row addresses, instead of only the cache row addresses of the addressed virtual access channel. If such a match exists, then the virtual channel control circuit 325 causes the desired data byte to be retrieved from the virtual access channel which contains the desired data byte, even if this virtual access channel is not the virtual access channel identified by the virtual channel select signals.

Write Operations

If the current access address does not match a cache address of any of the virtual access channels (cache miss), and the read/write signal indicates that the memory access is a write operation, then the virtual channel control circuit 325 causes the write data byte provided by the memory master to be written to the channel row cache memory 601–607 which is identified by the virtual channel select signals. The virtual channel control circuit 325 additionally updates the corresponding cache row address register 701–707 to reflect the current access address. Because only one data byte is written to the channel row cache memory (which stores 64 bytes), the other 63 bytes are provided to the channel row cache memory from the appropriate memory bank.

The following example will clarify the write operation for a cache miss. First, the current access address, the virtual channel select signals, the write control signal and the data byte are routed from the memory master to the virtual channel control circuit 325. In the present example, it is assumed that the virtual channel select signals identify the cacheable virtual access channel 1 (as identified by elements 501, 601, 701 and 801), and that the data byte, $B_3$, is the fourth data byte of a 64-byte word within one of memory banks 301–304.

The virtual channel control circuit 325 compares the current access address with the contents of the cache row address registers 701–707 and determines that no match exists. In response, the virtual channel control circuit 325 writes the current access address to cache address 701a in cache row address register 701. The virtual channel control circuit 325 also writes the data byte $B_3$ to the fourth byte position in cache entry 601a of channel row cache memory 601. This write operation is performed through cache row interface circuit 801. Substantially in parallel with this write operation, virtual channel control circuit 325 accesses the 64-byte data word at the current access address in memory banks 301–304. This 64-byte word is routed to cache row interface circuit 501. Virtual channel control circuit 325 controls cache row interface circuit 501 to perform a byte write masking function. That is, cache row interface circuit 501 only passes Bytes 0–2 and 4–63 of the 64-byte word to cache entry 601a of channel row cache memory 601. In this manner, a current 64-byte cache entry is provided to channel row cache memory 601.

The data byte $B_3$ is not immediately written through to memory banks 301–304 (i.e., write through is eliminated). Instead, data byte B3 remains in channel row cache memory 601 until cache entry 601a is restored. Note that any subsequent read accesses to the current access address will cause the data byte $B_3$ to be properly read from channel row cache memory 601 (due to cache row aliasing). Consequently, channel row aliasing eliminates the need for cache snooping. That is, there is no need to continuously monitor new write addresses (snoop) to determine whether a new write operation overwrites memory banks 301–304 without updating a corresponding cache entry.

If the current access address matches a cache address of any of the virtual access channels (cache hit), and the read/write signal indicates that the memory access is a write operation, then the virtual channel control circuit 325 causes the write data byte provided by the memory master to be written to the cache entry which resulted in the cache hit.

For example, if a cache hit exists because the current access address corresponds to the cache address 701a stored in channel row address register 701, then virtual channel control circuit 325 causes the new data byte to be routed through cache row interface circuit 801 to overwrite one of the bytes in the 64-byte cache entry 601a. The byte to be overwritten is determined by the current access address. This new data byte is routed to the appropriate byte location within the 64-byte cache entry 601a by cache row interface circuit 801. Cache row interface circuit 801 performs this de-multiplexing function in response to control signals received from virtual channel control circuit 325. In this manner, data coherence within memory system 300 is maintained.

The cache entry 601a is not immediately restored to the memory banks 301–304. Instead, the restore operation is delayed until some later time. This enables a plurality of consecutive data bytes to be written to cache entry 601a without requiring an access to memory banks 301–304 after each data byte. A memory master can issue a restore command which causes the contents of a cache entry to be written to the appropriate row of the appropriate memory bank whenever the memory master anticipates a new cache entry will be required. A restore command can be implemented concurrently with another operation (read or write) between a virtual access channel and memory system interface 314. In the described embodiment, multiple restore operations can be concurrently implemented in the multiple memory banks 301–304. The concurrent restore operations among the banks are staggered, by virtue of the fact that the restore commands are initiated at different times by the memory masters. This staggering ensures that the memory bank interface bus 310 is used at different times to complete the data transfer operations from the virtual access channels 1–8 to the memory banks 301–304. To enable the host memory controller to easily track the status of bus 310, the restore operation is defined to have a duration of a fixed number of clock cycles.

In accordance with another aspect of the present invention, other memory access functionalities can be implemented by the virtual access channels. For example, the virtual access channels can also implement prefetch operations within memory system 300. Prefetch refers to the retrieving of data bytes from memory arrays 301–304 during the time that other data bytes are being read from the virtual access channels. The host memory controller is controlled to ensure that any necessary restore operations are performed prior to performing a prefetch operation.

A prefetch command can be issued by a memory master. The prefetch command specifies that a particular row is to be read from a particular one of memory banks 301–304 and loaded into a particular entry of a specified one of the virtual access channels 1–8, via the memory bank interface bus 310. The prefetch command can be executed concurrently with an operation that involves the reading or writing of data between the virtual access channels 1–8 and the memory system interface 314 on the memory system interface bus 312. Furthermore, each of the memory banks 301–304 can be performing separate prefetch operations with respect to different cache entries in different virtual access channels. Of course, these concurrent prefetch operations among the memory banks 301–304 are pipelined (staggered at different phase of operations) by virtue of the fact that the prefetch commands are issued/initiated at different times. Furthermore, the staggered stages of execution also ensure that there is no conflict in the use of the memory bank interface bus 310 in transferring the data from the memory banks 301–304 to the virtual access channels 1–8.

In accordance with another aspect of the invention, the virtual channel control circuit 325 can include an 8-bit precharge control register which includes 1 precharge control bit for each of the eight virtual access channels. If a precharge control bit has a first logic value, then auto-precharge is implemented in the corresponding virtual access channel. In auto-precharge mode, after each write operation to a channel row cache memory, a corresponding write operation is performed to memory banks 301–304. If a precharge control bit has a second logic value, then a non-automatic precharge is implemented in the corresponding virtual access channel.

As previously discussed, only one operation can be performed on memory bank interface bus 310 at any given time. Similarly, only one operation can be performed on memory system interface bus 312 at any given time. However, concurrent operations can be performed on memory bank interface bus 310 and memory system interface bus 312. For example, data can be prefetched from a memory bank to a channel row cache memory at the same time that data is being read from a channel row cache memory to memory system interface 314. Similarly, a restore operation can be performed from a channel row cache memory to a memory bank at the same time that data is being read from a channel row cache memory to memory system interface 314.

In an alternative embodiment, multiple memory systems (chips) can be connected in parallel to create a larger channel row cache memory and a wider output bus. For example if eight memory systems identical to memory system 300 were connected in parallel, the result would be a 64-bit output bus. Eight virtual access channels would exist, with each virtual access channel consisting of a channel row cache memory within each memory system. Thus, each of the eight virtual access channels would have a width of 512 bytes (8×64 bytes).

In another embodiment, the effective length of the channel row cache memory can be increased by chaining two of the channel row cache memories. For example, channel row cache memories 601 and 602 can be chained as follows. First, a 64-byte word of a row within memory bank 301 is written to a cache entry within channel row cache memory 601. This first 64 byte word can be, for example, the first 64 bytes of the 1024 byte row of data read from the memory bank. The first 64 byte word can then be read out from channel row cache memory 601, one byte at a time. As the individual bytes of the first 64 byte word are sequentially read out of channel row cache memory 601, a second 64 byte word is read from memory bank 301 and stored in channel row cache memory 602. This second 64 byte word can be, for example, the second 64 bytes of the memory row. The second 64 byte word is stored in channel row cache memory 602 before the last byte of the first 64 byte word is read out of channel row cache memory 601. The second 64 byte word can therefore be read out from channel row cache memory 602 in a seamless manner after the first 64 byte word.

In an alternative embodiment, a third 64 byte word can then be read out of memory bank 301 and stored in channel row cache memory 601 while the bytes of the second 64 byte word are read out of channel row cache memory 602. In this manner, any number of 64 byte words can be chained together, thereby creating a channel row cache memory having an infinite length. Such a recirculating chaining scheme is particularly useful for memory masters which tend to "walk and play hopscotch" through a large block of memory. Such memory masters include those which engage in screen refresh operations, reading a texture map in reverse mapping operation for 3D graphics, and video stream processing.

Virtual channel control circuit 325 can include a chain control register which controls the chaining mode within the various virtual access channels. In one embodiment, the chain control register would be a 16-bit register, with a 2-bit entry corresponding to each of the eight virtual access channels. Each of these two bit entries would identify one of the following chaining options: (1) no chaining, (2) chaining of two cache entries, and (3) infinite chaining. The chain control register is programmed by the external data processing system in accordance with the operating characteristics of the memory masters.

In the foregoing manner, each virtual access channel can be provided with its own independent operating characteristics, thereby enabling the virtual access channels to be modified to match the operating characteristics of the individual memory masters.

Figure 5:
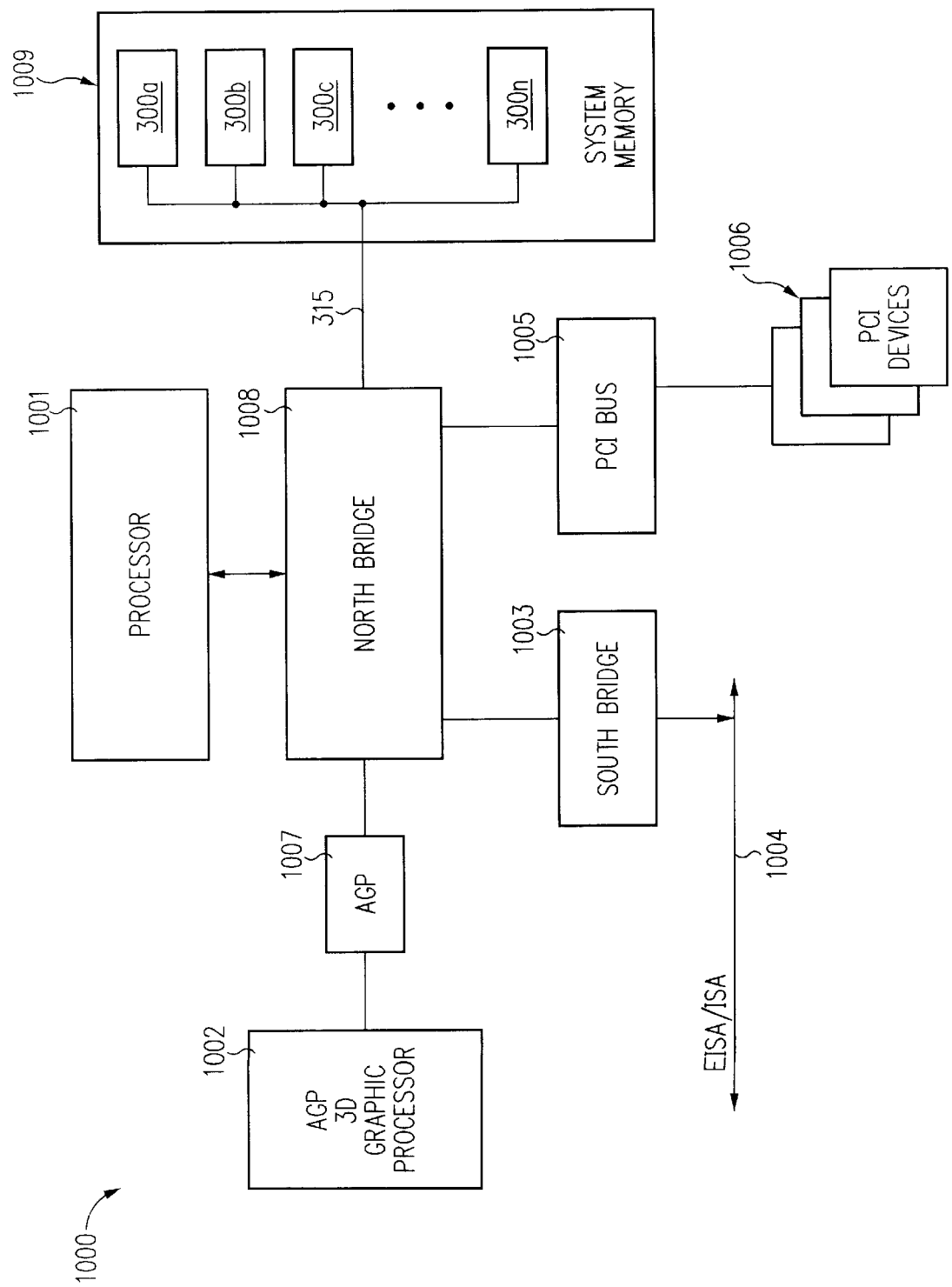
FIG. 5 is a block diagram of an accelerated graphic processor system which implements the memory system of FIG. 3 in accordance with one embodiment of the invention.
Figure 6:
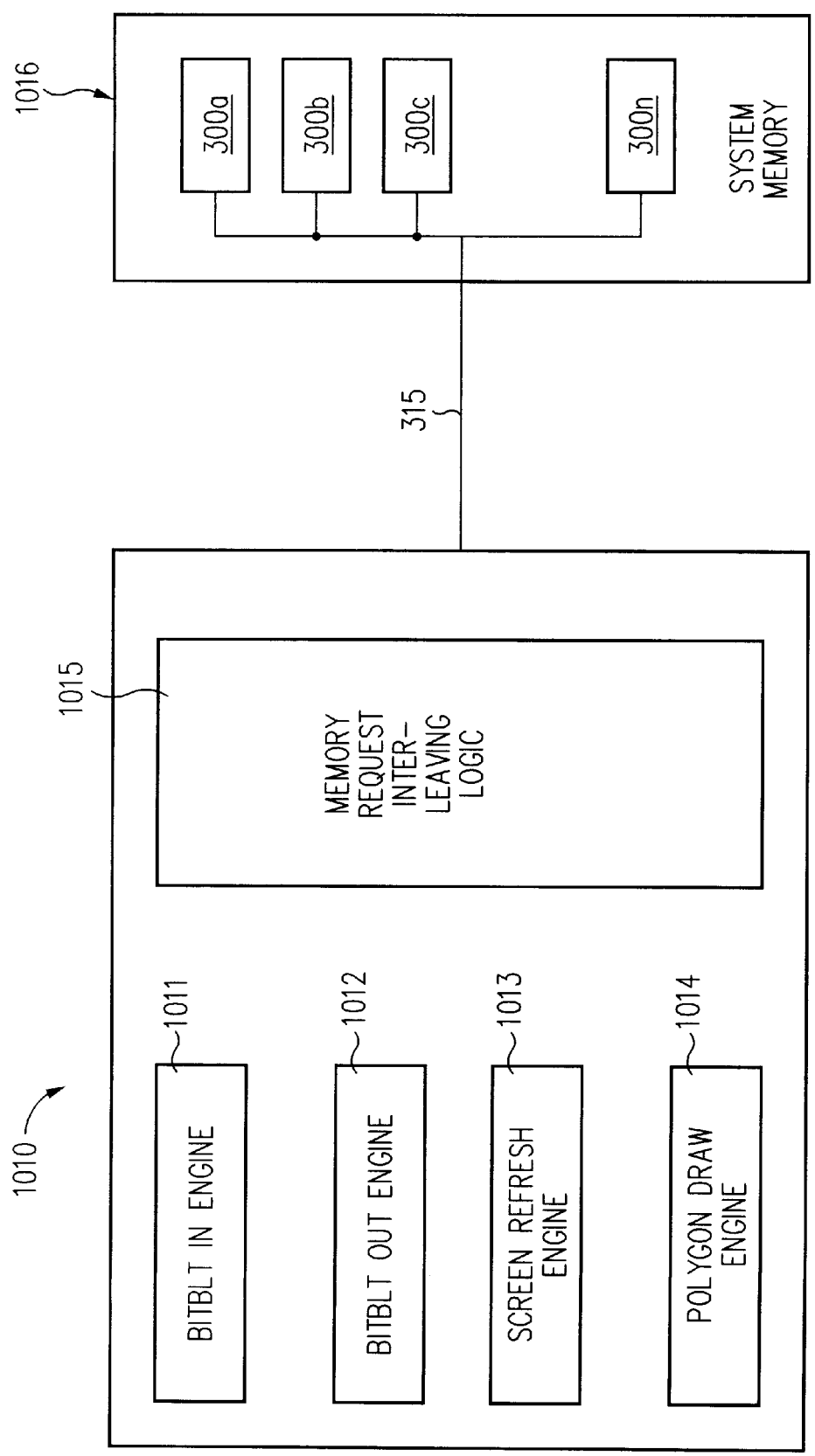
FIG. 6 is a block diagram of a pipelined graphic system which implements the memory system of FIG. 3 in accordance with another embodiment of the invention.

The previously described memory systems can be used in the data processing systems illustrated in FIGS. 5 and 6.

FIG. 5 is a block diagram of a personal computer (PC) 1000 which is equipped with an Accelerated Graphic Processor (AGP). PC 1000 implements a multi-tasking system memory 1009 in accordance with the previously described embodiments. System memory 1009 includes a plurality of parallel connected memory systems 300a–300n, each of which is substantially identical to previously described memory system 300 (FIG. 3). The system memory 1009 is independently accessed (through the north bridge circuit 1008) by the processor 1001, the AGP 3-D graphic processor 1002, the south bridge circuit 1003 (which is the master for the EISA/ISA bus 1004) and the PCI bus master 1005 (which interfaces with the PCI devices 1006). The AGP circuit 1007 provides an interface between the AGP processor 1002 and the north bridge circuit 1008. In a particular implementation, each of these bus masters (i.e., processor 1001, AGP processor 1002, south bridge circuit 1003 and PCI bus master 1005) assumes control of one or more of the virtual channels present in the system memory 1009. The assignment of the specific virtual channels can be hardwired, static (as determined by the BIOS during power on), or dynamically managed by memory management codes below the operating system kernel. Four cached virtual channels are assigned to (1) processor 1001 instruction access, (2) processor 1001 data access, (3) AGP processor 1002 texture mapping access, and (4) PCI bus master 1005 access. The non-cached virtual channel is assigned to (1) memory refresh and (2) ISA bus master 1003.

FIG. 6 is a block diagram of a pipelined graphic system 1010 implementing multi-tasking memory system 300. The Bit Blit In engine 1011, the Bit Blit Out engine 1012, the screen refresh engine 1013 and the polygon draw engine 1014 (each being conventional processing engines) can each independently act as a memory master to access the low latency memory 1016 through the memory request interleaving logic 1015. Again, memory 1016 includes a plurality of memory systems 300a–300n which are substantially identical to previously described memory system 300. Again, each of the memory masters 1011–1014 is assigned to access one or more of the virtual channels within the system memory 1016.

In another example, the memory system of the present invention is used as a 2D/3D graphic frame buffer. In this example, four cached virtual channels are respectively mapped to a screen refresh process, a 3D rendering process, a 2D drawing and polygon fill process, and a texture mapped write process. The non-cached virtual channel is mapped to a memory refresh process.

In yet another embodiment, the present invention is implemented in connection with an SDRAM array. In such an embodiment, three additional pins are added to a conventional SDRAM memory chip to enable the selection of four cached virtual channels and a non-cached virtual channel. A performance gain of 2.0 to 2.5 times can be realized on small and large block accesses, respectively.

In yet another embodiment, the present invention is implemented in connection with an RDRAM (RAMBUS DRAM) array. RDRAM typically has two banks, each with 2 KBytes of write through cache. This is modified to include four virtual channels of 1 KByte row cache. Bits in the RDRAM request packets are used to select the virtual access channels. Multiple memory masters reside in a single pipelined multi-tasking controller. A performance gain of 80% can be realized in an RDRAM memory chip.

In general, each system processor may include a plurality of memory masters, each of which performs a particular type of processing task. These memory masters can access the memory at different frequencies, as determined by the tasks performed. Each memory master will also exhibit a different behavior in terms of numbers of consecutive bytes read/ written for every address locality. Thus, even if there is only one physical device accessing memory system 300, a multiplicity of memory masters may still be present. In most cases, there are multiple physical devices attached to the memory system 300, and each of these physical devices may include one or more memory masters.

The foregoing has described the principles and preferred embodiments of the present invention. However, the invention should not be construed as being limited to the particular embodiments described. The above-described embodiments should be regarded as illustrative rather than restrictive. Variations can be made to those embodiments by workers skilled in the art without departing from the scope of the present invention as defined by the following claims.

We claim:

1. A memory system for connection to a system bus, the memory system comprising:
   a memory bank bus;
   a plurality of memory banks coupled to the memory bank bus;
   a plurality of virtual access channels coupled in parallel between the system bus and the memory bank bus, wherein each of the virtual access channels provides a set of memory access resources for accessing any of the plurality of memory banks, and wherein each of the virtual access channels is independently addressable by signals provided on the system bus;
   wherein the virtual access channels comprise one or more cacheable virtual access channels which perform caching operations; and
   wherein each of the cacheable virtual access channels comprises a data cache memory and a corresponding address cache memory.

2. The memory system of claim 1, wherein each data cache memory comprises a plurality of cache entries, and each corresponding address cache memory comprises a corresponding plurality of cache address entries.

3. The memory system of claim 1, further comprising a virtual channel control circuit which enables the virtual access channels in response to signals received on the system bus.

4. The memory system of claim 1, further comprising means for prefetching data from the memory banks to a specified virtual access channel on the memory bank bus.

5. The memory system of claim 4, wherein the means for prefetching data concurrently implements prefetch operations in different ones of the memory banks.

6. The memory system of claim 4, wherein the means for prefetching data implements prefetch operations at the same time that data is transferred between the system bus and the virtual access channels.

7. The memory system of claim 1, further comprising means for restoring data stored in the virtual access channels to the memory banks.

8. A The memory system of claim 7, wherein the means for restoring data concurrently implements restore operations in different ones of the memory banks.

9. A The memory system of claim 7, wherein the means for restoring data implements restore operations at the same time that data is transferred between the system bus and the virtual access channels.

10. A memory system for connection to a system bus, the memory system comprising:

a memory bank bus;

a plurality of memory banks coupled to the memory bank bus;

a plurality of virtual access channels coupled in parallel between the system bus and the memory bank bus, wherein each of the virtual access channels provides a set of memory access resources for accessing any of the plurality of memory banks, and wherein each of the virtual access channels is independently addressable by signals provided on the system bus;

wherein the virtual access channels comprise one or more cacheable virtual access channels which perform caching operations; and wherein the virtual access channels further comprise a non-cacheable virtual access channel which bypasses the cacheable virtual access channels.

11. A memory system for connection to a system bus, the memory system comprising:

a memory bank bus;

a plurality of memory banks coupled to the memory bank bus;

a plurality of virtual access channels coupled in parallel between the system bus and the memory bank bus, wherein each of the virtual access channels provides a set of memory access resources for accessing any of the plurality of memory banks, and wherein each of the virtual access channels is independently addressable by signals provided on the system bus;

wherein the virtual access channels comprise one or more cacheable virtual access channels which perform caching operations; and a precharge control register which stores a plurality of precharge control bits, each precharge control bit corresponding to one of the cacheable virtual access channels, wherein each precharge control bit defines one of a plurality of precharge modes to be implemented by the corresponding cacheable virtual access channel.

12. A memory system for connection to a system bus, the memory system comprising:

a memory bank bus;

a plurality of memory banks coupled to the memory bank bus;

a plurality of virtual access channels coupled in parallel between the system bus and the memory bank bus, wherein each of the virtual access channels provides a set of memory access resources for accessing any of the plurality of memory banks, and wherein each of the virtual access channels is independently addressable by signals provided on the system bus;

wherein the virtual access channels comprise one or more cacheable virtual access channels which perform caching operations; and a burst length control register which stores a plurality of burst length control bytes, each burst length control byte corresponding to one of the cacheable virtual access channels, wherein each burst length control byte defines a burst access length for the corresponding cacheable virtual access channel.

13. The memory system of claim 12, wherein the burst length control bytes are independently programmable to provide different cacheable virtual access channels with different burst access lengths.

14. A memory system for connection to a system bus, the memory system comprising:

a memory bank bus;

a plurality of memory banks coupled to the memory bank bus;

a plurality of virtual access channels coupled in parallel between the system bus and the memory bank bus, wherein each of the virtual access channels provides a set of memory access resources for accessing any of the plurality of memory banks, and wherein each of the virtual access channels is independently addressable by signals provided on the system bus;

wherein the virtual access channels comprise one or more cacheable virtual access channels which perform caching operations; and a chain control register which stores a plurality of chain control bytes, wherein each chain control byte defines one of a plurality of chaining modes to be implemented within a corresponding cacheable virtual access channel.

* * * * *